(No Model.)

J. F. MARTIN.
MEANS FOR SUPPORTING INSULATORS FOR ELECTRIC WIRES IN UNDERGROUND CONDUITS.

No. 286,943.          Patented Oct. 16, 1883.

Witnesses:         Inventor:
Frank J. Blanchard.      John F. Martin
Will R. Onohundro.    By Jno. G. Elliott
                        Attorney.

UNITED STATES PATENT OFFICE.

JOHN F. MARTIN, OF CHICAGO, ILLINOIS.

MEANS FOR SUPPORTING INSULATORS FOR ELECTRIC WIRES IN UNDERGROUND CONDUITS.

SPECIFICATION forming part of Letters Patent No. 286,943, dated October 16, 1883.

Application filed March 12, 1883. (No model.)

*To all whom it may concern:*

Be it known that I, JOHN F. MARTIN, a citizen of the United States, residing in Chicago, county of Cook, and State of Illinois, have invented certain new and useful Improvements in Means for Supporting Insulators for Electric Wires in Underground Conduits, of which the following is a specification.

This invention relates to means for supporting tubular insulators for electric wires within an underground conduit, the object being to provide a cheap, simple, and efficient support by which the tubular insulators can be readily introduced into a conduit-pipe without liability of the tubes becoming twisted and injured, and also so that, if necessary, one or more of the tubular insulators can be withdrawn from the support without disturbing the remaining tubes.

To such end my invention consists in a cylindrical frame composed of two or more annular bands connected together by longitudinal strips, the tubular insulators being placed parallel with each other within said frame, so as to form a bundle of tubes. This frame, with its inclosed bundle of tubular insulators, can be inserted into either end of a pipe-section, and then passed along into the same, so as to place and hold the tubular insulators in readiness to receive the electric wires, which can be pushed or drawn through the tubular insulators while the latter are supported within the conduit-pipe.

My invention further consists in the combination, with a conduit-pipe provided with internal longitudinal grooves, of a support for tubular insulators for electric wires, consisting of two or more annular bands provided with peripheral sets of ears, and annular bands connected together by longitudinal strips that are attached to said ears.

Figure 1:
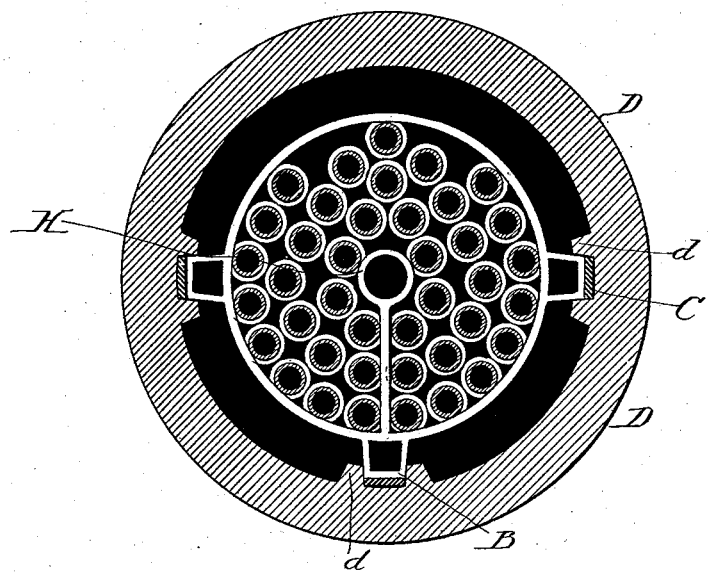
Figure 2:
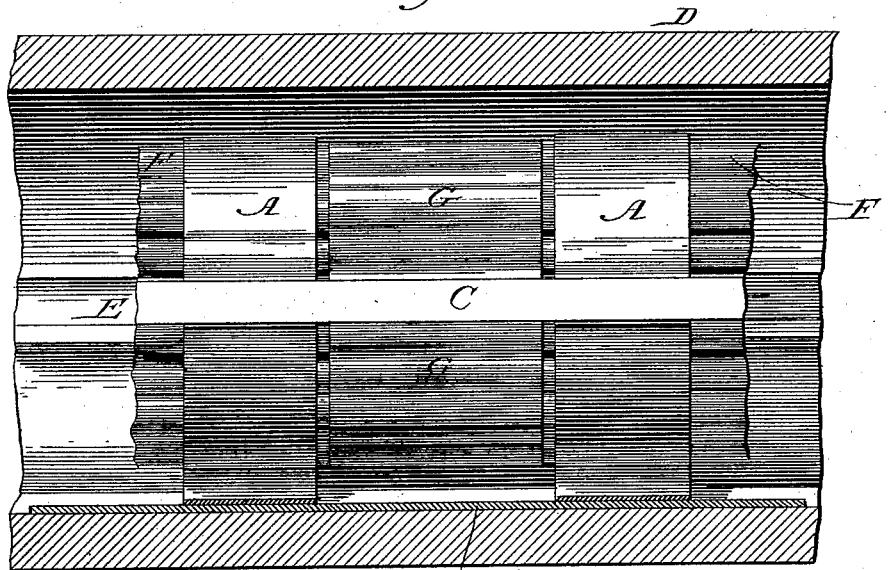

In the annexed drawings, Figure 1 represents an end view of my improved support containing a bundle of tubular insulators, with the conduit-pipe shown in cross-section. Fig. 2 shows the conduit-pipe in longitudinal section, and the support, with a bundle of tubular insulators, in side elevation.

A indicates the annular bands, which can be made of metal, paper, or of any suitable insulating material. Each one of these bands is formed or provided upon its periphery with two or more lugs or ears, B, either of the same or of a different material from the band. These bands are set and held at suitable distances apart by means of the longitudinal strips C, that are attached to the lugs or ears in any convenient way. The conduit-pipe D is provided with internal longitudinal ribs, *d*, that extend from end to end of each pipe-section and run parallel with each other. These ribs are grooved longitudinally along their entire length, in order to provide guides for the supporting-frame.

It will be seen that the longitudinal connecting-strips of the cylindrical frames are adapted to fit in the groove E of the ribs, and, if preferred, the outer portions of the ears can also be received in the said grooves, as shown. The tubular insulators F are laid side by side within this frame, as shown; and in order to connect the sections of these tubular insulators so as to form continuous lines of tubing, I couple the tube-sections together by means of sleeves G, into which the opposing ends of the tubular insulators are inserted, and thereby held together, as indicated in Fig. 2. Supporting-frames of this construction, with any desired number of tubular insulators held thereby, can be inserted into the pipe-sections as the latter are laid, and pushed into the same, so as to provide lines of tubular insulators extending throughout the line of conduit. The longitudinal strips fitting in the grooves prevent the frame from turning, and hence no twisting of the tubular insulators can take place.

It will be seen that an annular passage is provided between the tubular insulators and the pipe, and also between the annular bands and the latter, so that in case air-currents are induced through the conduit-pipe the air can circulate freely around the bundle of tubular insulators. I also support a short tube, H, at or about the center of each one of the annular bands, so as to provide an air-passage through the center of the bundle of tubular insulators. These short tubes H are connected with the bands by means of arms, one or more of said arms being provided for each tube.

The supporting-frames can be made as long as the pipe-sections, and can each contain as many annular bands as may be found necessary to properly support the tubular insulators. In order to provide for the more ready passage of these frames through the conduit-pipe, I can, in some instances, provide each longitudinal connecting-strip with anti-friction rollers journaled in slots or mortises formed in the strips, in which case the rollers will run along the beds or bottoms of the longitudinal grooves.

The coupling-sleeves G are arranged between the annular bands, and hence the outer set or circle of tubes can lie against the inner faces of the annular bands, while the extreme outer portions of the coupling-sleeves for such tubes will be nearly flush with the outer faces of the said bands. This arrangement admits of each annular band being compactly filled with the tubular insulators, and at the same time provide room for their couplings.

Having thus described my invention, what I claim, and desire to secure by Letters Patent, is—

1. As a means for supporting tubular insulators for electric wires within a conduit, a cylindrical frame composed of two or more annular bands connected together by longitudinal strips, substantially as described.

2. The cylindrical frame for supporting tubular insulators for electric wires, comprising two or more annular bands provided with peripheral sets of lugs or ears, to which longitudinal connecting-strips are attached, substantially as described.

3. The combination, with a conduit-pipe provided with internal longitudinal grooves, of a support for tubular insulators, consisting of two or more annular bands connected together by longitudinal strips, substantially as described.

4. In a longitudinal supporting-frame for tubular insulators for electric wires, such as described, the short centrally-located tubes H, connected by radial arms with the annular bands of the frame, substantially as described.

JOHN F. MARTIN.

Witnesses:
W. W. ELLIOTT,
JNO. G. ELLIOTT.